US012668648B2

(12) United States Patent
Favero et al.

(10) Patent No.: US 12,668,648 B2
(45) Date of Patent: Jun. 30, 2026

(54) POLYMER OF 2-ACRYLAMIDO-2-METHYLPROPANE SULPHONIC ACID AND USE THEREOF

(71) Applicant: SNF Group, Andrezieux Boutheon (FR)

(72) Inventors: Cédrick Favero, Andrezieux Boutheon (FR); Johann Kieffer, Andrezieux Boutheon (FR)

(73) Assignee: SNF Group, Andrezieux Boutheon (FR)

( * ) Notice: Subject to any disclaimer, the term of this patent is extended or adjusted under 35 U.S.C. 154(b) by 110 days.

(21) Appl. No.: 18/562,773

(22) PCT Filed: Jul. 8, 2022

(86) PCT No.: PCT/FR2022/051379

§ 371 (c)(1), (2) Date: Nov. 20, 2023

(87) PCT Pub. No.: WO2023/281233

PCT Pub. Date: Jan. 12, 2023

(65) Prior Publication Data

US 2025/0263507 A1 Aug. 21, 2025

(30) Foreign Application Priority Data

Jul. 9, 2021 (FR) ....................................... 2107483

(51) Int. Cl.

*C08F 20/58* (2006.01)
*C09K 8/588* (2006.01)

(Continued)

(52) U.S. Cl.

CPC .............. *C08F 20/58* (2013.01); *C09K 8/588* (2013.01); *C09K 8/68* (2013.01); *C09K 8/80* (2013.01);

(Continued)

(58) Field of Classification Search

CPC ........................................................ C09K 8/88

See application file for complete search history.

(56) References Cited

U.S. PATENT DOCUMENTS 6,120,780 A * 9/2000 Dupuis .................. A61K 8/731 424/59
2019/0338060 A1* 11/2019 Fischer ............... C08F 220/585

(Continued)

FOREIGN PATENT DOCUMENTS

EP 2203245 B1 7/2011
EP 3601220 B1 5/2021

(Continued)

OTHER PUBLICATIONS

Allison et al., "Reference and Intercomparison Materials for Stable Isotopes of Light Elements", International Atomic Energy Agency, 1995, in 159 pages.

(Continued)

*Primary Examiner* — William D Hutton, Jr.
*Assistant Examiner* — Avi T Skaist
(74) *Attorney, Agent, or Firm* — Knobbe, Martens, Olson & Bear, LLP

(57) ABSTRACT

A water-soluble polymer has weight-average molecular weight greater than 10 million daltons. This polymer is obtained from 2-acrylamido-2-methylpropane sulfonic acid and/or one of its salts at least partially of renewable and non-fossil origin. The polymer can be used in the field of enhanced oil and gas recovery or in the treatment of tailings from the mining industry.

16 Claims, 3 Drawing Sheets

Figure 1:
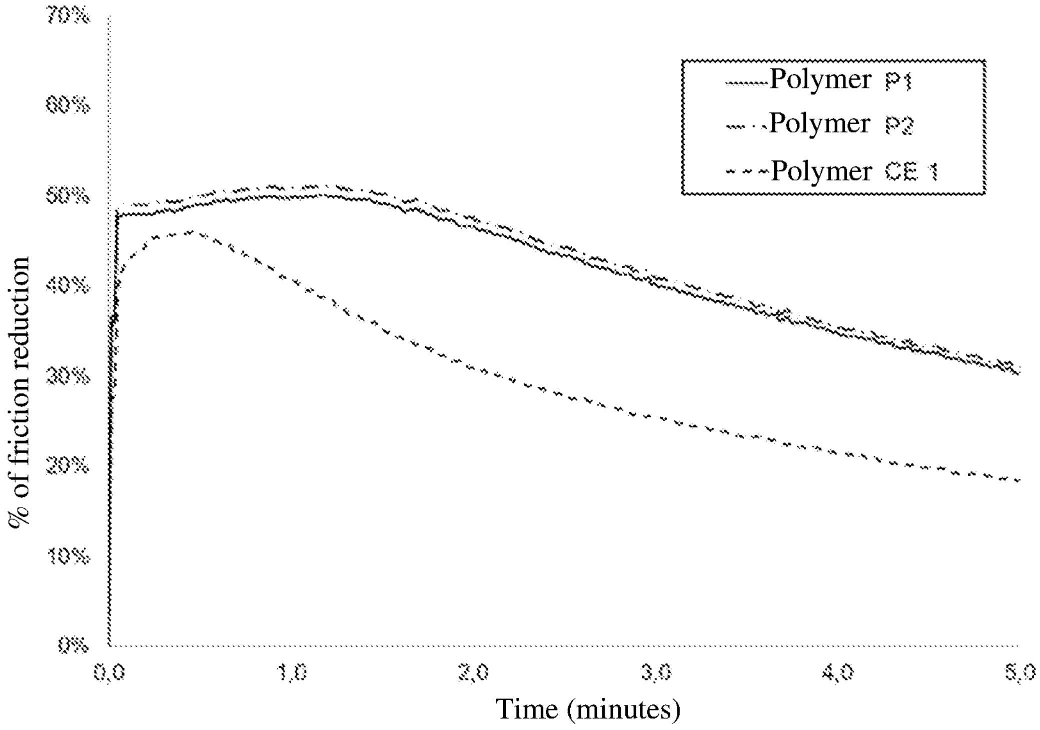

(51) Int. Cl.

| | |
|---|---|
| ***C09K 8/68*** | (2006.01) |
| ***C09K 8/80*** | (2006.01) |
| ***E21B 43/16*** | (2006.01) |
| ***E21B 43/267*** | (2006.01) |
| ***E21B 43/27*** | (2006.01) |

(52) U.S. Cl.

CPC ............ *E21B 43/16* (2013.01); *E21B 43/267* (2013.01); *E21B 43/27* (2020.05)

(56) References Cited

U.S. PATENT DOCUMENTS

| | | | | |
|---|---|---|---|---|
| 2020/0009041 | A1 | 1/2020 | Fischer et al. | |
| 2020/0031765 | A1* | 1/2020 | Favero | C09K 8/88 |
| 2020/0087186 | A1 | 3/2020 | Favero et al. | |

FOREIGN PATENT DOCUMENTS

| | | | |
|---|---|---|---|
| EP | 3601222 | B1 | 6/2021 |
| WO | WO 2010/133258 | A1 | 11/2010 |

OTHER PUBLICATIONS

Griffin et al., "Classification of Surface-Active Agents by HLB", Journal of the Society of Cosmetic Chemists, 1949, pp. 311-326.

International Search Report and Written Opinion issued in International Application No. PCT/FR2022/051379, dated Nov. 4, 2022.

Roessler et al., "Time-Resolved Liquid Scintillation Counting", Liquid Scintillation Counting and Organic Scintillators, 1991, pp. 501-511.

* cited by examiner

POLYMER OF 2-ACRYLAMIDO-2-METHYLPROPANE SULPHONIC ACID AND USE THEREOF

FIELD OF THE INVENTION

This invention relates to a polymer based on bio-2-acrylamido-2-methylpropane sulfonic acid and/or one of its salts and its use in various technical fields, and in particular in the field of enhanced oil and gas recovery and in the treatment of tailings from the mining industry. The polymers of the invention are of particular interest in enhanced oil recovery by sweeping an underground formation, and in hydraulic fracking.

PRIOR ART

Polymers based on 2-acrylamido-2-methylpropane sulfonic acid (AMPS) and/or one of its salts are widely used in many technical fields. In certain applications, linear polymers based on very high molecular weight AMPS are sought. This is the case in the field of enhanced oil and gas recovery and in the treatment of tailings from the mining industry.

However, there are many reasons, undesired and sudden, to bring in these linear polymers a degree of branching or ramification that leads to a deterioration of the performance of linear polymers based on very high molecular weight AMPS. Generally a cause of undesired branching comes from the impurities in the monomers used to manufacture the polymer, said impurities coming most often from the raw materials used to manufacture said monomers.

In the case of the AMPS monomer, the impurities of acrylonitrile are, for example, acrolein or methylvinyl ketone, and the impurities of isobutylene are alkenes having at least two unsaturations. Many techniques exist to reduce the level of these impurities, but they each have their limits.

The problem that the invention proposes to solve is a new polymer based on AMPS and/or one of its salts of very high molecular weight, and possessing a very high degree of linearity.

SUMMARY OF THE INVENTION

Quite surprisingly, the Applicant has observed that the use of 2-acrylamido-2-methylpropane sulfonic acid and/or one of its salts at least partially of renewable and non-fossil origin made it possible to achieve this objective and to improve the application performance of these polymers. Firstly, the invention relates to a linear polymer with a weight-average molecular weight greater than 10 million daltons, said polymer being obtained from 2-acrylamido-2-methylpropane sulfonic acid and/or one of its salts at least partially of renewable and non-fossil origin.

The polymer according to the invention is preferably obtained by inverse emulsion polymerization or by gel route polymerization.

The degree of linearity is determined by the filter-ratio method. Preferably, the polymer according to the invention has a filter-ratio (or "FR") of less than 1.2, preferably less than 1.17, more preferably less than 1.13, even more preferably less than 1.1.

Another subject-matter of the invention provides a method for enhanced oil or gas recovery by sweeping a subterranean formation, which comprises injecting an aqueous composition into the subterranean formation, comprising the following steps:

a. Preparing an injection fluid from a polymer according to the invention, with water or brine,
b. Injecting the injection fluid into a subterranean formation,
c. Sweeping the subterranean formation using the injected fluid,
d. Recovering an aqueous, oily, and/or gaseous mixture.

The invention relates to a method for hydraulic fracking of underground oil or gas reservoirs comprising the following steps:

a. Preparing an injection fluid from a polymer according to the invention, with water or brine, and with at least one proppant,
b. Injecting said fluid into the subterranean reservoir and fracking at least a portion thereof to recover oil and/or gas.

The invention also relates to a method of treating a suspension of solid particles in water resulting from mining or oil sands operations, comprising placing said suspension in contact with at least one polymer according to the invention.

DETAILED DISCLOSURE OF THE INVENTION

In the context of the invention, the degree of linearity is determined by the filter-ratio method, detailed below.

The term filter-ratio is used in this document to refer to a test used to determine polymer solution performance under conditions approximating the permeability of the deposit consisting of measuring the time taken for given volumes/concentrations of solution to traverse a filter The FR generally compares the filterability of the polymer solution in two consecutive equivalent volumes, which indicates the tendency of the solution to clog the filter. Lower FRs indicate better performance.

The test used to determine the FR consists of measuring the times it takes for the given volumes of solution containing 1000 active ppm of polymer to flow through a filter. The solution is contained in a pressurized cell at two bars of pressure and the filter is 47 mm in diameter and of a defined pore size. Generally the FR is measured with filters having a pore size of 1.2 μm, 3 μm, 5 μm, or 10 μm.

The times needed to obtain 100 ml ($t_{100ml}$); 200 ml ($t_{200ml}$) and 300 ml ($t_{300ml}$) of filtrate are therefore measured and a FR is then defined, expressed by:

$$FR = \frac{t_{300ml} - t_{200ml}}{t_{200ml} - t_{100ml}}$$

Times are measured to the nearest 0.1 second.

The FR thus represents the capacity of the polymer solution to clog the filter for two consecutive equivalent volumes.

In the context of the invention, the term "of renewable and non-fossil origin" designates the origin of a chemical compound derived from biomass or synthesis gas (syngas), i.e., say being the result of one or more chemical transformations carried out on one or more raw materials having a natural origin, and not fossil. The terms "bio-based" or "bio-based" may also be used to characterize the renewable and non-fossil origin of a chemical compound. The renewable and non-fossil origin of a compound includes renewable and non-fossil raw materials from the circular economy, and which have been previously recycled, one or more times, during a process of recycling material from biomass, such as, for example, materials resulting from the depolymerization of polymers or from the transformation of pyrolysis oil.

According to the invention, the quality of "at least partially of renewable and non-fossil origin" of a compound means a biosourced carbon content preferably between 5% by weight and 100% by weight relative to the total weight of carbon of said compound.

In the context of the invention, method B of standard ASTM D6866-21, is used to characterize the biobased nature of a chemical compound, and to determine the biobased carbon content of said compound. The value is expressed as a percentage by weight of biobased carbon relative to the total weight of carbon in said compound.

The ASTM D6866-21 standard is a test method that teaches how to experimentally measure the bio-based carbon content of solids, liquids, and gaseous samples by radiocarbon analysis.

This standard mainly uses the technology of the AMS ("Accelerator Mass Spectrometry") in English, mass spectrometry by accelerator. This technique is used to naturally measure the radionuclides present in a sample, in which the atoms are ionized, then accelerated to high energies, then separated, and individually counted in Faraday collectors. This high-energy separation is extremely effective at filtering out isobaric interference, so the AMS is able to accurately measure the abundance of carbon-14 relative to carbon-12 (14C/12C) to an accuracy of $1 \cdot 10^{-15}$.

Method B of the ASTM D6866-21 standard uses AMS and IRMS (Isotope Ratio Mass Spectroscopy). The test method makes it possible to directly differentiate between carbon atoms from renewable carbon and carbon atoms of fossil origin. A measurement of the carbon-14 to carbon-12 or carbon-14 to carbon-13 content of a product is determined relative to a current carbon-based reference material accepted by the radiocarbon dating community such as NIST's Standard Reference Material (SRM) 4990C (oxalic acid).

The method to prepare samples is described in the standard and does not require any particular comments as it corresponds to a commonly used procedure.

The analysis, interpretation and reporting of results are described below. Isotope ratios of carbon-14 content to carbon-12 or carbon-14 content to carbon-13 are measured using AMS. Isotope ratios of carbon-14 content to carbon-12 or carbon-14 content to carbon-13 are determined against a standard traceable to NIST SRM 4990C modern reference standard. The "fraction of modern" (Fm) represents the amount of carbon-14 in the product tested compared to the modern standard. It is most often referred to as percentage modern carbon (pMC), the percentage equivalent to Fm (e.g., Fm 1=100 pMC).

All pMC values obtained from radiocarbon analyzes should be corrected for isotopic fractionation using a given stable isotope. The correction should be made using carbon-14 to carbon-13 content values determined directly from the AMS where possible. If this is not possible, correction should be made using delta 13C (δ13C) measured by IRMS, CRDS ("Cavity Ring Down Spectroscopy") or any other equivalent technology that can provide precision to plus or minus 0.3 per thousand. "Zero pMC" represents the complete absence of measurable 14C in a material above background signals thus indicating a fossil carbon source (e.g., petroleum-based). A value of 100 pMC indicates a fully "modern" carbon source. A pMC value between 0 and 100 indicates a proportion of carbon derived from a fossil source compared to a "modern" source.

The pMC may be greater than 100% due to the continuing, but diminishing, effects of atmospheric 14C injection caused by atmospheric nuclear testing programs. pMC values should be adjusted by an atmospheric correction factor (REF) to obtain the true biobased content of the sample.

The correction factor is based on the excess 14C activity in the atmosphere at the time of the tests. A REF value of 102 pMC was determined for 2015 based on CO2 measurements in the air in a rural area in the Netherlands (Lutjewad, Groningen). The first version of this standard (ASTM D6866-04) in 2004 had referenced a value of 107.5 pMC and the later version ASTM D6866-10 (2010) had referenced a value of 105 pMC. These data points correspond to a decline of 0.5 pMC per year. Therefore, on January 2 of each year, the values in Table 1 below are used as the REF until 2019, reflecting the same decrease of 0.5 pMC per year. The REF (pMC) values for 2020 and 2021 were determined to be at 100.0 based on continuous measurements taken in the Netherlands (Lutjewad, Groningen) through 2019. References for reporting carbon isotope ratio data are given below for 14C and 13C, respectively.

Roessler, N., Valenta, R J, and van Cauter, S., "Time-resolved Liquid Scintillation Counting," *Liquid Scintillation Counting and Organic Scintillators*, Ross, H., Noakes, J E, and Spaulding, J D, Eds., Lewis Publishers, Chelsea, MI, 1991, p. 501-511. Allison, C E, Francy, R J, and Meijer, H A J, "Reference and Intercomparison Materials for Stable Isotopes of Light Elements," International Atomic Energy Agency, Vienna, Austria, *IAEATECHDOC*-825, 1995.

The calculation of bio-sourced carbon content into %, is done by dividing pMC by REF and multiplying the result by 100. For instance, [102 (pMC)/102 (REF)]×100=100% biobased carbon. The results are indicated in percentage by weight of biobased carbon relative to the total weight of carbon in said compound.

TABLE 1

| Percent Modern Carbon (pMC) Reference | |
|---|---|
| REF Year | pMC |
| 2015 | 102.0 |
| 2016 | 101.5 |
| 2017 | 101.0 |
| 2018 | 100.5 |
| 2019 | 100.0 |
| 2020 | 100.0 |
| 2021 | 100.0 |

In the context of the invention, the term "segregated" is understood to mean a material flow that is distinctive and distinguishable from other material flows in a value chain (e.g., in a product manufacturing process), and therefore considered to be part of a set of materials of an equivalent nature, such that the same origin of the material, or its manufacture according to the same standard or norm, may be tracked and guaranteed throughout the value chain.

This corresponds, for example, to the purchase by a chemist of 100% biosourced 2-acrylamido-2-methylpropane sulfonic acid (AMPS) exclusively from a single supplier who guarantees the 100% biosourced origin of the AMPS delivered, and the processing separately from other potential sources of AMPS by said chemist transforming this 100% biosourced AMPS to produce a chemical compound. If the produced chemical compound is only made from said 100% bio-based AMPS, then the chemical compound is 100% bio-based.

In the context of the invention, the term "non-segregated", as opposed to the term "segregated", is understood to mean a material flow that cannot be distinguished from other material flows in a value chain.

In order to better understand this notion of segregation, it is useful to recall some basics concerning the circular economy and its practical application in processes, in particular chemical transformation.

According to ADEME (French Environment and Energy Management Agency), the circular economy may be defined as an economic system of exchange and production which, at all stages of the products' life cycle (goods and services), seeks to increase the efficiency of the use of resources and reduce the impact on the environment while developing the well-being of individuals. In other words, it is an economic system dedicated to efficiency and sustainability that minimizes waste by optimizing the value generated by resources. It relies heavily on various conservation and recycling methods to break away from the current, more linear approach of "seize, produce, and throw away".

In the field of chemistry, which is the science of the transformation of a substance into another substance, this results in the reuse of a material that has already been used to manufacture a product. Theoretically all chemicals may be isolated and therefore recycled separately from other chemicals. The industrial reality in particular is more complex and means that even isolated, the compound very often cannot be distinguished from the same compound coming from another origin, making the traceability of the recycled material complex.

It is for this reason that various traceability models have been developed, taking this industrial reality into account, allowing users in the chemical industry to manage their material flows with full knowledge of the facts, and allowing end customers to understand and know in a simple way the origin of the materials used to produce an object or a commodity.

These models were developed to create transparency and trust throughout the value chain. Ultimately, this allows end users or customers to select a more sustainable solution without having the ability themselves to control every aspect of the process, knowing the proportion of a desired component (e.g., of a bio-based nature) in an object or a commodity.

One of these models is "segregation." We have given a definition of this term previously. Some known examples of the application of this model are glass and certain metals for which it is possible to follow material flows separately.

But the chemicals are often used in complex combinations, and the distinct cycles are very often difficult to set up, in particular for reasons of prohibitive costs and ultra-complex flow management, which means that the "segregation" model is not always applicable.

Consequently, when it is not possible to distinguish between the material flows, other models are applied, which are grouped together under the term "non-segregated" and which consist, for example, of accurately taking into account the proportion of a specific flow in relation to the other flows, without physically separating the flows. One may cite for example mass or weight balance approach ("Mass Balance Approach").

The mass or weight balance approach consists of accurately tracking the proportion of a category (for example "recycled") in relation to a whole in a production system in order to ensure, on the basis of an auditable ledger, a proportionate and appropriate attribution of the content of said category in a finished product.

This may correspond, for example, to the purchase by a chemist of 2-acrylamido-2-methylpropane sulfonic acid (AMPS) biobased at 50% from a supplier guaranteeing, according to the mass or weight balance approach, that in the AMPS delivered, 50% of the AMPS from a bio-based source, and de facto 50% does not have a bio-based origin, and the use by said chemist of this 50% bio-based AMPS with another flow of AMPS 0% biosourced, the two streams can no longer be differentiated at some point in production, due to a mixture for example. If the chemical compound produced is made from 50% by weight of AMPS guarantees 50% bio-based, and 50% by weight of AMPS 0% bio-based, then the chemical compound is 25% bio-based.

To guarantee the figures displayed for "biosourced" rates, for example, and encourage the use of biosourced raw materials in the production of new products, a set of rules shared and standardized on a global scale (ISCC+, ISO 14020) was developed to reliably manage material flows.

In the context of the invention, the term "recycled" is understood to mean the origin of a chemical compound resulting from a process for recycling a material considered as waste, i.e., being the result of one or more transformations carried out during at least one recycling process on at least one material generally considered as waste.

In the present description, the expressions "between X and Y" and "from X to Y" include the terminals X and Y.

Throughout the invention, the biobased carbon content of a compound for which it is specified that it is at least partially of renewable and non-fossil origin, or for which the biobased carbon content is specified, relative to the total weight of carbon in said compound, is 5% by weight to 100% by weight, and preferably from 10% by weight to 100% by weight, preferably from 15% by weight to 100% by weight, preferably from 20% by weight to 100% by weight, preferably from 25% by weight to 100% by weight, preferably from 30% by weight to 100% by weight, preferably from 35% by weight to 100% by weight, preferably from 40% by weight to 100% by weight, preferably from 45% by weight to 100% by weight, preferably from 50% by weight to 100% by weight, preferably from 55% by weight to 100% by weight, preferably from 60% by weight to 100% by weight, preferably from 65% by weight to 100% by weight, preferably from 70% by weight to 100% by weight, preferably from 75% by weight to 100% by weight, preferably from 80% by weight to 100% by weight, preferably 85% by weight to 100% by weight, preferably 90% by weight to 100% by weight, preferably 95% by weight to 100% by weight, preferably 97% by weight at 100% by weight, preferably from 99% by weight to 100% by weight, the biobased carbon content being measured according to method B of standard ASTM D6866-21.

Polymer According to the Invention

The subject-matter of the invention is a linear polymer with a weight average molecular weight greater than 10 million daltons, said polymer being obtained from 2-acrylamido-2-methylpropane sulfonic acid and/or one of its salts that is at least partially of renewable and non-fossil origin. Preferably, the polymer according to the invention has a filter-ratio (or "FR") of less than 1.2, preferably less than 1.17, more preferably less than 1.13, even more preferably less than 1.1. Polymer A according to the invention preferably has a filter-ratio (or "FR") lower by at least 0.1 unit than the filter-ratio of a polymer B which is identical to polymer A but whose only difference is that polymer B is not obtained from 2-acrylamido-2-methylpropane sulfonic acid and/or one of its salts is at least partially of renewable and non-fossil origin. The filter-ratio of polymer A is preferentially lower by at least 0.12 unit than the filter-ratio of a polymer B, more preferentially lower by at least 0.15 unit, even more preferentially lower by at least 0.17 unit, even more preferentially lower by at least 0.19 units.

In the invention, 2-acrylamido-2-methylpropane sulfonic acid and/or one of its salts has a biobased carbon content relative to the total weight of carbon in said 2-acrylamido-2-methylpropane sulfonic acid of between 5% by weight and 100% by weight, the biobased carbon content being measured according to method B of standard ASTM D6866-21.

The reaction implemented in the process for the preparation of 2-acrylamido-2-methylpropane sulfonic acid corresponds to the reaction scheme below, in which the acrylonitrile is present in excess so as to be both the solvent of the reaction and a reactant. The acrylonitrile is brought into contact with fuming sulfuric acid (oleum) and isobutylene.

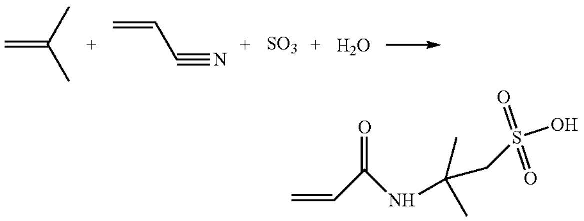

In the invention, the acrylonitrile used to make 2-acrylamido-2-methylpropane sulfonic acid and/or a salt thereof has a bio-sourced carbon content based on the total weight of carbon in said acrylonitrile of between 5% by weight and 100% by weight, wherein the bio-sourced carbon content is measured in accordance with method B of standard ASTM D6866-21.

In the invention, the isobutylene used to make 2-acrylamido-2-methylpropane sulfonic acid and/or a salt thereof has a bio-sourced carbon content based on the total weight of carbon in said isobutylene of between 5% by weight and 100% by weight, wherein the bio-sourced carbon content is measured in accordance with method B of standard ASTM D6866-21.

In the invention, the 2-acrylamido-2-methylpropane sulfonic acid is preferably totally of renewable and non-fossil origin. Preferably, the acrylonitrile is totally of renewable and non-fossil origin. Preferably, the isobutylene is totally of renewable and non-fossil origin.

In the invention, the expression "2-acrylamido-2-methylpropane sulfonic acid" is used to designate 2-acrylamido-2-methylpropane sulfonic acid and/or one of its salts. The water-soluble salts of these monomers are their alkali metal, alkaline earth metal, ammonium, or alkylamine salts.

The polymer according to the invention is water-soluble. The term "water soluble polymer" means a polymer which gives a clear aqueous solution when dissolved under stirring at 25° C. and with a concentration of 20 $g \cdot L^{-1}$ in water.

The polymer according to the invention may be a homopolymer of 2-acrylamido-2-methylpropane sulfonic acid and/or one of its salts at least partially of renewable and non-fossil origin, or a copolymer of at least one 2-acrylamido-2-methylpropane sulfonic acid and/or one of its salts, at least partially of renewable and non-fossil origin, and of at least one different additional monomer, the latter being advantageously selected from at least one nonionic monomer, and/or at least one anionic monomer, and/or at least one cationic monomer, and/or at least one zwitterionic monomer, and/or at least one monomer comprising a hydrophobic group.

The polymer according to the invention preferably comprises at least 10 mol % 2-acrylamido-2-methylpropane sulfonic acid and/or one of its salts being at least partially of renewable and non-fossil origin, more preferably at least 20 mol %, even more preferably at least 25 mol %, even more preferably at least 30 mol %, even more preferably at least 40 mol %, even more preferably at least 50 mol %, even more preferably at least 60 mol %, even more preferably at least 65 mol %, even more preferably at least 70 mol %, even more preferably at least 80 mol %, even more preferably at least 90 mol %.

The nonionic monomer is preferably selected from acrylamide, methacrylamide, N-isopropylacrylamide, N,N-dimethylacrylamide, N,N-diethylacrylamide, N-vinylformamide (NVF), N-vinyl acetamide, N-vinylpyridine and N-vinylpyrrolidone (NVP), N-vinyl imidazole, N-vinyl succinimide, acryloyl morpholine (ACMO), acryloyl chloride, glycidyl methacrylate.thereof.

The anionic monomer is preferably selected from acrylic acid, methacrylic acid, itaconic acid, crotonic acid, maleic acid, fumaric acid, acrylamido undecanoic acid, 3-acrylamido 3-methylbutanoic acid, maleic anhydride, vinylsulfonic acid, vinylphosphonic acid, allylsulfonic acid methallylsulfonic acid, 2-sulfoethylmethacrylate, sulfopropylmethacrylate, sulfopropylacrylate, allylphosphonic acid, styrene sulfonic acid, 2-acrylamido-2-methylpropane disulfonic acid, and water-soluble salts of these monomers such as their alkali metal, alkaline earth metal, or ammonium salts. It is preferentially acrylic acid (and/or one of its salts).

The cationic monomer is preferably selected from quaternized dimethylaminoethyl acrylate (ADAME), quaternized dimethylaminoethyl methacrylate (MADAME), dimethyldiallylammonium chloride (DADMAC), acrylamido propyltrimethyl ammonium chloride (APTAC), and methacrylamido propyltrimethyl ammonium chloride (MAPTAC).

The zwitterionic monomer may be a derivative of a vinyl-type unit, in particular acrylamide, acrylic, allylic or maleic, this monomer having an amine or ammonium (advantageously quaternary) function and a carboxylic (or carboxylate), sulfonic (or sulfonate) or phosphoric (or phosphate) acid function.

Monomers having a hydrophobic character can also be used in the preparation of the polymer. They are preferably selected from the group consisting of (meth)acrylic acid esters having an alkyl, arylalkyl, propoxylated, ethoxylated or ethoxylated and propoxylated chain; (meth)acrylamide derivatives having an alkyl, arylalkyl, propoxylated, ethoxylated, ethoxylated and propoxylated chain, or dialkyl alkyl aryl sulfonates, or by mono- or di-substituted amides of (meth)acrylamide having an alkyl, arylalkyl, propoxylated, ethoxylated, or ethoxylated and propoxylated chain; derivatives of (meth)acrylamide having an alkyl, arylalkyl, propoxylated, ethoxylated, ethoxylated and propoxylated, or dialkyl chain; alkyl aryl sulfonates; the ethoxy/propoxy units may be alternated or in block form.

All of these monomers may also be biosourced.

In one particular embodiment of the invention, the water-soluble polymer may comprise at least one LCST group, for example an LCST macromonomer.

According to the general knowledge of those skilled in the art, an LCST group corresponds to a group whose solubility in water for a given concentration is modified above a certain temperature. This is a group exhibiting a transition temperature by heating defining its lack of affinity with the solvent medium (water). The lack of affinity with the solvent results in an opacification or a loss of transparency which may be due to precipitation, aggregation, gelling, or viscosification of the medium. The minimum transition temperature is called "LCST" (the acronym for "Lower Critical Solution Temperature"). For each group concentration at LCST, a heating transition temperature is observed. It is greater than the LCST which is the minimum point on the curve. Below this temperature the polymer is soluble in water, above this temperature the polymer loses its water solubility.

Generally, the LCST macromonomer is obtained by synthesizing an LCST oligomer with a functional end and subsequently grafting an ethylenic group onto this functional end.

In one particular embodiment of the invention, the water-soluble polymer may comprise at least one LCST group, for example an LCST macromonomer.

The polymerization techniques may be selected from radical polymerization, controlled radical polymerization known as RAFT (reversible-addition fragmentation chain transfer), NMP (nitroxide mediated polymerization) or ATRP (Atom Transfer Radical Polymerization.

The polymer according to the invention may be modified after it has been obtained by polymerization. This is called post modification of the polymer. All known post-modifications may be applied to the polymer according to the invention, and the invention also relates to the polymers obtained after said post-modifications. Among the possible post modifications developed below, mention may be made of post hydrolysis and post-modification by Hoffman reaction.

The polymer according to the invention may be obtained by carrying out a post-hydrolysis reaction on a polymer obtained by polymerization of at least one monomer obtained by the method according to the invention or of at least one monomer as previously described in the "Monomer" section. Before the post-hydrolysis, the polymer comprises, for example, monomeric units of acrylamide or of methacrylamide. The polymer may also further comprise monomeric units of N-vinylformamide. More precisely, post-hydrolysis consists of the reaction of hydrolyzable functional groups of monomeric units that are advantageously non-ionic, more advantageously amide or ester functions, with a hydrolyzing agent. This hydrolyzing agent may be an enzyme, an ion exchange resin, an alkali metal, or a suitable acidic compound. Preferably, the hydrolysis agent is a Brønsted base. When the polymer comprises monomeric amide units and/or esters, then the post-hydrolysis reaction produces carboxylate groups. When the polymer comprises formamide monomer units, then the post-hydrolysis reaction produces amine groups.

According to the invention, the polymer may be in the form of an inverse emulsion, gel or solid when its preparation includes a drying step such as "spray drying", drum drying, radiation drying such as microwave drying, or even fluidized bed drying.

The comonomers combined with the monomer according to the invention to obtain the polymer of the invention are preferably at least partially, preferably totally of renewable and non-fossil origin.

Thus, in a preferred embodiment, the invention relates to a polymer comprising:

- at least 10% molar, preferably at least 15% molar, preferably between 20% and 99% molar, of a first monomer, said monomer being 2-acrylamido-2-methylpropane sulfonic acid and/or one of its salts at least partially of renewable and non-fossil origin, and
- at least 1% molar, preferably between 10% and 90% molar, more preferably between 10% and 80% molar of at least one second monomer comprising ethylenic unsaturation, said second monomer being different from the first monomer, and being at least partially of renewable and non-fossil.

Thus, in one preferred embodiment, the invention relates to a polymer comprising:

- at least 10 mol %, preferably at least 15 mol %, preferably between 20 mol % and 99 mol %, of a first monomer said monomer being 2-acrylamido-2-methylpropane-sulfonic acid and/or one of its salts at least partially of renewable and non-fossil origin, and
- at least 1 mol %, preferably between 10 mol % and 90 mol %, more preferably between 10 mol % and 80 mol %, of at least one second monomer comprising an ethylenic unsaturation said second monomer being different from the first monomer and being at least partially of renewable and non-fossil origin,
- at least 1 mol %, preferably between 5 mol % and 90 mol %, more preferably between 10 mol % and 80 mol %, of at least one third monomer comprising an ethylenic unsaturation, said third monomer being different from the first and the second monomer and being at least partially of renewable and non-fossil origin.

The polymer according to the invention may comprise four or more different monomers.

In one preferred embodiment, the second and the optional other monomers have a biobased carbon content of between 5% by weight and 100% by weight, preferably 10% by weight and 100% by weight, relative to the total weight of carbon in the monomer concerned, the biobased carbon content being measured according to method B of standard ASTM D6866-21.

In this preferred embodiment, the second and any other monomers are preferably selected from acrylamide, acrylic acid and/or a salt thereof, an oligomer of acrylic acid and/or a salt thereof, N-vinylformamide (NVF), N-vinylpyrrolidone (NVP), dimethyldiallylammonium chloride (DADMAC), quaternized dimethylaminoethyl acrylate (ADAME), quaternized dimethylaminoethyl methacrylate (MADAME), a substituted acrylamide of the formula $CH_2{=}CHCO{-}NR_1R_2$, where $R_1$ and/or $R_2$ is a linear or branched carbon chain $C_nH_{2n+1}$, in which n is between 1 and 10.

Throughout the invention, it should be understood that the % molar of monomers used to make the polymer is 100%.

The at least partially renewable, non-fossil 2-acrylamido-2-methylpropane sulfonic acid may be non-segregated, partially segregated, or fully segregated.

When it is fully of renewable and non-fossil origin, then it may be:

a) Either fully of recycled origin and a)1) Totally segregated;

a)2) Either partially segregated;

a)3) Or non-segregated;

b) Either partially of recycled origin and b)1) Fully segregated;

b)2) Either partially segregated;

b)3) Or non-segregated;

c) Either fully of non-recycled origin, and c)1) Fully segregated;

c)2) Either partially segregated;

c)3) Or not segregated.

When it is partially segregated in these different embodiments, then the weight ratio between the "segregated" part and the "non-segregated" part is preferably between 99:1 and 10:90, preferably between 99:1 and 30:70, more preferably between 99:1 and 50:50.

Among these different embodiments, the three a) embodiments, the three b) embodiments and the c)1) embodiment are preferred. Among these embodiments, embodiments a)1), a)2), b)1), b)2), and c)1) are even more preferred. The two most preferred embodiments are a)1) and b)1).

Industrial reality is that it is not always possible to obtain industrial quantities of fully recycled and/or segregated or highly recycled and/or segregated bio-sourced 2-acrylamido-2-methylpropane acid. This is why the aforementioned preferences are perhaps more difficult to implement at present. From a practical point of view, embodiments a)3), b)3), and the c) embodiments are currently implemented more easily and on a larger scale. With technology rapidly evolving in the direction of the circular economy, there is no doubt that the preferred embodiments, which can already be applied, may quickly be implemented on a very large scale.

When 2-acrylamido-2-methylpropane acid is partially of renewable and non-fossil origin, then a distinction is made between the renewable (bio-sourced) part and the non-bio-sourced part. Each of these parts may of course be in accordance with the same embodiments a), b) and c) as previously described.

With regard to the bio-based part of the partially bio-based compound, the same preferences as in the case where the compound is totally bio-based apply.

But when it comes to the non-biobased part of the partially biobased compound, then it's even more preferable to have as much recycled component as possible for a circular economy approach. This is why, in this case, embodiments a)1), a)2), b)1), b)2) will be preferred, and in particular, a)1) and b)1).

The polymer according to the invention preferably has a weight average molecular weight of between 11 and 40 million daltons, more preferably between 12 and 40 million, even more preferably between 13 and 40 million daltons, even more preferably between 15 and 40 million. The molecular weight may be determined by the intrinsic viscosity of the (co)polymer. The intrinsic viscosity may be measured by methods known to those skilled in the art and may be calculated from the reduced viscosity values for different (co)polymer concentrations by a graphical method consisting of plotting the reduced viscosity values (y-axis) on the concentration (x-axis) and extrapolating the curve to zero concentration. The intrinsic viscosity value is plotted on the ordinate axis or using the least squares method. The molecular weight may then be determined by the Mark-Houwink equation:

$$[\eta]=K\ M^{\alpha}$$

- $[\eta]$ represents the intrinsic viscosity of the (co)polymer determined by the solution viscosity measurement method.
- K represents an empirical constant.
- M represents the molecular weight of the (co)polymer.
- $\alpha$ represents the Mark-Houwink coefficient.
- K and $\alpha$ depend on the particular (co)polymer-solvent system.

In one particular embodiment of the invention, 2-acrylamido-2-methylpropane sulfonic acid and/or one of its salts used to synthesize the polymer of the invention comes partially or totally from a recycling process.

In this particular embodiment, the polymer according to the invention is obtained by the following steps:

- Recycling at least one material at least partially of renewable and non-fossil origin to obtain 2-acrylamido-2 acid-methylpropane sulfonic and/or a salt thereof;
- Polymerizing said 2-acrylamido-2-methylpropane sulfonic acid and/or one of its salts, optionally with at least one nonionic, anionic monomer, and/or cation to obtain a polymer.

The recycling rate corresponds to the ratio by weight of the recycled material to the total material.

Polymer According to the Invention Obtained by Inverse Emulsion Polymerization

In one particularly preferred embodiment, the invention relates to a polymer obtained by polymerization of at least one 2-acrylamido-2-methylpropane sulfonic acid monomer and/or one of its salts, said monomer being at least partially of renewable and non-fossil origin, and said polymer being obtained by inverse emulsion polymerization.

The invention therefore also relates to an inverse emulsion comprising at least one polymer according to the invention. The invention also relates to a solid polymer obtained by drying or spray drying of the inverse emulsion according to the invention.

The polymer contained in the inverse emulsion according to the invention preferably has a weight-average molecular weight greater than 10 million daltons, more preferably between 11 and 40 million daltons, even more preferably between 12 and 40 million, even more preferably between 13 and 40 million daltons, even more preferably between 15 and 40 million.

An inverse emulsion, otherwise known as a water-in-oil emulsion, is composed of an oily phase, usually a lipophilic solvent or an oil, which constitutes the continuous phase, in which water droplets comprising a polymer are suspended, these droplets of water forming a dispersed phase. An emulsifying surfactant (known as a water-in-oil surfactant) interfacing water/oil stabilizes the dispersed phase (water+polymer) in the continuous phase (lipophilic solvent or oil).

In inverse emulsions, an oil-in-water surfactant, which is an inverting agent, makes it possible to invert the emulsion and therefore to release the polymer when the emulsion is mixed with an aqueous fluid.

The inverse emulsion according to the invention may be prepared according to any method known to those skilled in the art. Generally, an aqueous solution comprising the monomer(s) and the water-in-oil surfactant(s) is emulsified in an oily phase. Subsequently, polymerization of the monomers is performed, advantageously by adding a free radical initiator.

Generally, the polymerization is performed in an isothermal, adiabatic, or temperature-controlled manner. In other words, the temperature is kept constant, generally between 1° and 95° C. (isothermal), or the temperature increases naturally (adiabatic) and in this case the reaction generally starts at a temperature below 40° C. and the final temperature is generally higher than 50° C. or, ultimately, the temperature increase is controlled so as to have a temperature curve between the isothermal curve and the adiabatic curve.

Usually, the reversing agent(s) is/are added at the end of the polymerization reaction, preferably at a temperature below 50° C.

The inverse emulsion according to the invention is preferably prepared according to the method comprising the following steps:

a) Preparing an aqueous phase comprising at least one 2-acrylamido-2-methylpropane sulfonic acid and/or one of its salts at least partially of renewable and non-fossil origin,
b) Preparing an oily phase comprising at least one oil and at least one water-in-oil surfactant,
c) Mixing the aqueous phase and the oily phase in order to form an inverse emulsion,
d) Once the inverse emulsion has formed, polymerizing the monomers of the aqueous phase using a radical polymerization initiator,
e) Optionally adding an oil-in-water surfactant,
f) Optionally distilling the inverse emulsion to increase the polymer concentration in said inverse emulsion Optionally distilling the inverse emulsion to increase the polymer concentration in said The weight ratio of the aqueous phase to the oil phase in the inverse emulsion is preferably from 30/70 to 90/10, more preferably from 70/30 to 80/20.

At the end of the polymerization reaction, it is also possible to dilute or concentrate the inverse emulsion obtained. Dilution is usually achieved by adding water, preferably salt water, to the inverse emulsion. In this case, it is possible to dilute the inverse emulsion and obtain a polymer concentration which can range up to 10% by weight. The emulsion obtained may be concentrated, for example by distillation. In this case, the reverse emulsion may be concentrated and a polymer concentration of up to 60% by weight may be attained.

The inverse emulsion oil according to the invention advantageously refers to an oil or a water-immiscible solvent. The oil used to prepare the water-in-oil emulsion of the invention may be a mineral oil, a vegetable oil, a synthetic oil, or a mixture of several such oils. Examples of mineral oils are mineral oils containing saturated hydrocarbons of the aliphatic, naphthenic, paraffinic, isoparaffinic, cycloparaffinic, or naphthyl type. Examples of synthetic oil are hydrogenated polydecene or hydrogenated polyisobutene; an ester such as octyl stearate or butyl oleate. Exxsol® products from ExxonMobil are suitable oils.

The inverse emulsion preferably comprises from 12 to 50% by weight of lipophilic oil or solvent, more preferably from 15 to 30% by weight.

The water-in-oil emulsion of step a) above preferably comprises from 30 to 55% by weight of water, more preferably from 35 to 48% by weight.

In this invention, the term "reverse emulsion surfactant" or "emulsifying agent" or "water-in-oil surfactant" refers to an agent capable of emulsifying water in oil while an "inverting agent" or "oil-in-water surfactant" refers to an agent capable of emulsifying oil in water. Specifically, an inverting agent is considered to be a surfactant with an HLB greater than or equal to 10, and an emulsifying agent is considered to be a surfactant with an HLB less than 10.

The hydrophilic-lipophilic balance (HLB) of a chemical compound is a measure of the degree of hydrophilicity or lipophilicity, determined by calculating the values for different regions of the molecule, as described by Griffin in 1949 (Griffin W C, Classification of Surface-Active Agents by HLB, Journal of the Society of Cosmetic Chemists, 1949, 1, pages 311-326).

In this invention, we have adopted Griffin's method which is based on calculating a value based on the chemical groups of the molecule. Griffin assigned a dimensionless number between 0 and 20 to give information on water and oil solubility. Substances with an HLB value of 10 are distributed between the two phases so that the hydrophilic group (molecular weight Mh) projects completely into the water while the lipophilic group (usually a hydrophobic hydrocarbon group) (molecular weight Mp) is in the non-water phase.

The HLB value of a substance having a total molecular mass M, a hydrophilic part with a molecular mass Mh and a lipophilic part with a molecular mass Mp is given by the following formula:

$$HLB = 20\left(Mh/M\right)$$

The emulsifying agent (water-in-oil surfactant) may be selected from surface-active polymers such as:

- polyesters with a weight average molecular weight between 1000 and 3000 g/mol, e.g., the condensation products between a polyisobutenyl succinic acid or its anhydride and a polyethylene glycol,
- block polymers with a weight average molecular weight advantageously between 2500 and 3500 g/mol, for example those sold under the names Hypermer®,
- sorbitan extracts such as sorbitan monooleate, sorbitan isostearate or sorbitan sesquioleate,
- sorbitan esters,
- diethoxylated oleocetyl alcohol,
- tetraethoxylated lauryl acrylate,
- condensation products of higher fatty alcohols with ethylene oxide, such as the reaction product of oleyl alcohol with 2 ethylene oxide units,
- condensation products of alkylphenols and ethylene oxide, such as the reaction product of nonylphenol with 4 ethylene oxide units.

Products such as Witcamide® 511, betaine products and ethoxylated amines may also be used as water-in-oil emulsifiers.

The inverse emulsion may contain several water-in-oil emulsifying agents. It preferably contains between 0.8 and 20% by weight of water-in-oil emulsifying agent, more advantageously between 1 to 10% by weight.

The radical polymerization initiator may be selected from the initiators conventionally used in radical polymerization. These may be, for example, hydrogen peroxides, azo compounds, or redox systems. Reference may be made to redox couples, with cumene hydroperoxide, tertiary butylhydroxyperoxide, or persulfates among the oxidizing agents, sodium sulfite, sodium metabisulfite, and Mohr's salt among the reducing agents. Azo compounds such as 2,2'-azobis (isobutyronitrile) and 2,2'-azobis (2-amidinopropane) hydrochloride may also be used.

The water-in-oil emulsion according to the invention preferably comprises from 8 to 60% by weight of polymer, preferably from 12 to 40%.

The inverse emulsion may comprise from 1 to 40% by weight of salts, preferably from 3 to 30% by weight, more preferably from 5 to 25% by weight of salts.

The salts present in the water-in-oil emulsion may be, for example, sodium salts, lithium salts, potassium salts, magnesium salts, aluminum salts, ammonium salts, phosphate salts, sulfate salts, chloride salts, fluoride salts, citrate salts, acetate salts, tartrate salts, hydrogen phosphate salts, water-soluble inorganic salts, other inorganic salts, and mixtures thereof. These salts include sodium chloride, sodium sulfate, sodium bromide, ammonium chloride, lithium chloride, potassium chloride, potassium bromide, magnesium sulfate, aluminum sulfate, and their mixtures. Sodium chloride, ammonium chloride, and ammonium sulfate are preferred and mixtures thereof are even more preferred.

The inverse emulsion containing the polymer of the invention (designated "polymer A") dissolved in the aqueous phase may also comprise solid particles of a water-soluble polymer (polymer B) obtained by polymerization of at least 10% molar, preferably at least 15% molar, preferably between 20% and 99% molar, of a first monomer, said first monomer being 2-acrylamido-2-methylpropane sulfonic acid and/or one of its salts at least partially of renewable and non-fossil origin, and at least 1% molar, preferably between 10% and 90% molar, more preferably between 10% and 80% molar of at least one second monomer comprising ethylenic unsaturation, said second monomer being different from the first monomer, and being at least partially of renewable and non-fossil.

Preferably, polymer B in the form of solid particles has the same composition as polymer A.

The polymer B particles are advantageously obtained by a method of polymerization by gel route known to those skilled in the art.

The water-soluble polymer B particles are advantageously incorporated into the inverse emulsion of polymer A with magnetic stirring.

The size of the polymer B solid particles before their incorporation into the inverse emulsion of polymer A, is represented by a D50 (median size) and is advantageously comprised between 5 μm and 500 μm.

The median size ($D_{50}$) of the particles is defined as the diameter of the particles for which half of the population (half in number of particles) is below this value.

Particle size refers to the average diameter measured using a laser diffraction particle analyzer according to conventional techniques of those skilled in the art. An example of a device for measuring mean diameter is the Mastersizer from Malvern Instruments.

Preferably, the mass ratio between the inverse emulsion of polymer A and the solid particles of polymer B is between 1:1 and 10:1.

Polymer According to the Invention Obtained by Gel Polymerization

In one particularly preferred embodiment, the invention relates to a polymer obtained by polymerization of at least one 2-acrylamido-2-methylpropane sulfonic acid monomer and/or one of its salts, said monomer being at least in part of renewable and non-fossil origin, and said polymer being obtained by gel polymerization.

Gel polymerization consists of polymerizing the monomer(s) to obtain a polymeric gel. In the context of the invention, the monomer(s) are polymerized in an aqueous medium, and the gel obtained is an aqueous gel.

In one preferred embodiment of the invention, the water-soluble polymer is obtained by gel polymerization optionally followed by drying and grinding to obtain polymer particles of the average desired size and optionally by sieving to obtain polymer particles having the correct particle size.

At the end of the reaction, the product resulting from the polymerization is a hydrated gel so viscous that it is self-supporting (thus a cube of gel measuring 2.5 cm per side substantially maintains its shape when placed on a flat surface). The gel thus obtained is a viscoelastic gel.

Preferably, the polymer obtained by gel route according to the invention has a weight-average molecular weight greater than 10 million daltons, more preferably between 11 and 40 million daltons, even more preferably between 12 and 40 million, even more preferably between 13 and 40 million daltons, even more preferably between 15 and 40 million.

The polymer according to the invention is preferably not obtained by polymerization by precipitation, nor by polymerization in solution.

Polymer According to the Invention Obtained by Bead Polymerization or in Aqueous Dispersion The polymer according to the invention may also be obtained by bead polymerization or by polymerization in an aqueous dispersion.

Inverse suspension polymerization is also called bead polymerization because it makes it possible to obtain spherical particles having the shape of a bead. It consists of the polymerization of water-soluble monomers in the aqueous phase dispersed in the form of droplets in a hydrophobic phase in the presence of at least one stabilizing surfactant. The monomers present in the droplets polymerize thanks to initiators to obtain "gelled" droplets composed mainly of water and polymer. One or more water and solvent extraction steps make it possible to isolate the polymer in the form of beads.

The technique of polymerization in aqueous dispersion consists of carrying out the polymerization of a monomer or a mixture of monomers in water containing a salt and/or other chemical agents such as dispersants in solution or in dispersion. Since the hydrophilic polymer formed during the polymerization is not soluble in the saline medium and/or a medium containing dispersants, it precipitates when it reaches a sufficiently high molecular weight. At the end of the polymerization, a liquid dispersion of polymer particles suspended in the aqueous mixture is obtained.

Method Using the Polymer According to the Invention

This invention relates to the various methods described below in which the polymers of the invention make it possible to improve the application performance. Performance is particularly improved in the field of enhanced oil and gas recovery and in the processing of tailings from the mining industry. The polymers of the invention are of particular interest in enhanced oil recovery by sweeping a subterranean formation, in hydraulic fracking.

Method for Enhanced Oil and/or Gas Recovery

The invention therefore relates to a method of enhanced oil or gas recovery by sweeping a subterranean formation which comprises the injection of an aqueous composition into the subterranean formation, and carrying out the following steps:

a. Preparation of an injection fluid from a polymer according to the invention, with water or brine,
b. Injection of the injection fluid into a subterranean formation,
c. Sweeping the subterranean formation using the injected fluid,
d. Recovering an aqueous, oily, and/or gaseous mixture.

This invention relates more specifically to enhanced oil recovery by chemical means involving the continuous injection of an aqueous solution containing at least one water-soluble polymer in the form of a dilute solution, said aqueous solution being capable of pushing the oil out of the rock. The injection of a viscous polymer solution according to the technique employed is carried out alone or in conjunction with other chemical compounds useful for enhanced oil recovery.

In all of these techniques, the effectiveness of sweeping by water injection is generally improved by the addition of water-soluble polymers. The expected and proven benefits offered by using polymers are improved sweeping and mobility control in the field so as to recover the oil quickly and efficiently by means of the "viscosification" of the injected water. These polymers will increase the viscosity of water.

The polymers according to the invention have a higher degree of linearity than that of the same polymers in which the AMPS used is not biosourced. The value of the filter-ratio FR is therefore lower and the injectivity properties improved. The action of injecting the polymer is improved and is therefore more effective in sweeping the subterranean formation. The polymer is less damaging to the geological formation and propagates better, making it possible to carry out the injection at lower pressures, higher flow rates, and for extended periods of time The yield of oil or gas recovery is thereby improved.

If necessary, before their dissolution in water, the polymers of the invention may be associated with stabilizing compounds in the manner described in patent application WO 2010/133258.

In this case, the polymer is implemented by dissolving in water or in brine, which is the form most often encountered on oil fields.

In general, the injection fluid contains, after introduction of the aqueous solution viscosified by the polymer(s), between 20 ppm and 5,000 ppm by weight of one or more water-soluble copolymers as described above, preferably between 300 ppm and 4,000 ppm.

The aqueous solution may also contain:

- at least a surfactant. The surfactants may, for example, be selected from anionic surfactants and their zwitterions selected from the group comprising derivatives of alkyl sulfates, alkyl ether sulfates, arylalkyl sulfates, arylalkyl ether sulfates, alkyl sulfonates, alkyl ether sulfonates, aryl alkyl sulfonates, aryl alkyl ether sulfonates, alkyl phosphates, alkyl ether phosphates, aryl alkyl phosphates, aryl alkyl ether phosphates, alkyl phosphonates, alkyletherphosphonates, arylalkylphosphonates, arylalkyletherphosphonates, alkylcarboxylates, alkylethercarboxylates, arylalkylcarboxylates, arylalkylethercarboxylates, alkyl polyethers, and arylalkyl polyethers. In the context of the invention, the term "alkyl" is understood to mean a hydrocarbon group, saturated or unsaturated, of 6 to 24 carbons, branched or not, linear or optionally comprising one or more cyclic units, which may optionally comprise one or more heteroatoms (O, N, S). An arylalkyl group is defined as an alkyl group as previously defined, comprising one or more aromatic rings, said aromatic rings possibly comprising one or more heteroatoms (O, N, S).

and/or

- at least one alkaline agent which may be selected from alkali metal or ammonium hydroxides, carbonates, and bicarbonates, such as sodium carbonate.

and/or

- at least one thinning agent such as polyvinyl alcohol modified or not, polyvinyl acetate or polyalkylene glycol of low molecular weight.
- at least stabilizing agent such as for example ITW, aqueous solution containing 15% by weight of thiourea and 7.5% by weight of isopropyl alcohol.

Advantageously, the injection fluid, after introducing the aqueous solution of the water-soluble polymer, has a viscosity of between 2 and 200 cps (centipoise), (viscosity measurements at 20° C. with a Brookfield viscometer with a UL module and at the speed of 6 revolutions per minute).

In the context of the invention, the viscosified aqueous solution containing the desired polymer(s) is then injected into an oil field, by following any technique known to those skilled in the art of enhanced oil recovery processes, also called "EOR". Its preparation is carried out on site, just upstream of its injection into the deposit. In general, all the components introduced into the aqueous solution are most often added to a circulation line of the aqueous or brine solution.

Hydraulic Fracking Method

The invention also relates to a method for hydraulic fracking of underground oil or gas reservoirs comprising the following steps:

a. Preparing an injection fluid from a polymer according to the invention, with water or brine, and optionally with at least one proppant,
b. Injecting said fluid into the underground reservoir and fracking at least one part thereof in order to recover the oil and/or the gas.

The purpose of hydraulic fracking is to create additional permeability and generate larger gas or oil production areas. Indeed, the low permeability, the natural barriers consisting of compact layers, and the impermeability caused by drilling operations strongly limit the production. The gas or oil contained in the unconventional reservoir cannot easily migrate from the rock to the well without stimulation. "Unconventional underground reservoirs" are deposits that require special extraction technologies because they do not exist in the form of an accumulation in a porous and permeable rock.

These hydraulic fracking operations on horizontal wells began in 1960 in the Appalachians and, today, several tens of thousands of operations have taken place in the United States.

Reservoir study, modeling, drilling, cementing, and stimulation technologies have become increasingly sophisticated and use equipment that allows these operations to be carried out in ever shorter time frames with an accurate analysis of the results.

Reservoir stimulation operations by fracking consist of injecting water at high pressure and very high flow rates to create fractures distributed perpendicular to the production wells. This is usually done in several stages to create fracking along the entire length of the horizontal well, thus covering a maximum volume of the reservoir.

In order to keep these fractures open, a propping agent is added (for example sand, plastic materials or calibrated ceramics) so as to prevent these fractures from closing and to maintain the capillarity created once the injection has stopped.

In order to reduce the hydraulic power required to inject water or brine rapidly into the underground formation, polymers known as friction reducers are used. The use of such polymers makes it possible to reduce pressure losses due to internal friction in the fluid up to 70%.

The polymers according to the invention have a higher degree of linearity than that of the same polymers in which the AMPS used is not biosourced. The value of the filter-ratio is therefore lower and the properties of dissolution and friction reduction are improved, as well as the suspension properties of proppants such as sand. In addition, the polymers according to the invention exhibit improved friction reduction properties. They dissolve more quickly in the aqueous injection fluid; they are therefore effective more quickly, especially at the beginning of the injection phase. The time needed to reach the maximum level of efficiency in friction reduction is decreased.

In this hydraulic fracking process, the polymer is preferably in the form of an inverse emulsion or a powder obtained by the gel route. The inverse emulsion form is particularly preferred.

The proppant may be selected without limitation from sand, ceramic, bauxite, glass beads, and resin-impregnated sand. It preferably represents from 0.5 to 40%, more preferably from 1 to 25% and even more preferably from 1.5 to 20%, by weight of the fracking fluid.

The fracking fluid preferably comprises between 0.01% and 3% by weight of polymer according to the invention, more preferably between 0.025% and 1%, by weight, based on the total weight of the fracking fluid.

The brine which makes up the fracking fluid may comprise other compounds known to those skilled in the art, such as those cited in the document SPE 152596, for example:

- Anti-swelling agents for clays such as chloride of potassium, or choline chloride, and/or
- Biocides to prevent the development of bacteria, in particular sulfate-reducing bacteria, which can form viscous masses that reduce passage surfaces. Mention may be made, for example, of glutaraldehyde, which is the most widely used, or else formaldehyde or isothiazolinones, and/or
- Oxygen reducers such as ammonium bisulfite to prevent the destruction of other components by oxidation and corrosion of the injection tubes, and/or
- Anti-corrosion additives to protect the tubes against oxidation by residual quantities of oxygen, N,N dimethylformamide being preferred, and/or
- Lubricants such as oil distillates, and/or
- Iron chelators such as citric acid, EDTA (ethylene diamine tetra-acetic acid), phosphonates, and/or
- Antiscale products such as phosphates, phosphonates, polyacrylates or ethylene glycol.

Method for Treating a Suspension of Solid Particles in Water Resulting from Mining or Oil Sands Exploitation The invention relates to a method of treating a suspension of solid particles in water resulting from mining or oil sands operations, comprising placing said suspension in contact with at least one polymer according to the invention.

The polymers according to the invention have a higher degree of linearity than that of the same polymers in which the AMPS used is not biosourced. As a result, the polymer is more effective in the treatment of sludges and suspensions and makes it possible to avoid an overdose and therefore an overconsumption of polymer.

Such a method may be carried out in a thickener, which is a retention zone, generally in the form of a section of tube with a diameter of several meters with a conical bottom in which the particles may settle. According to one specific embodiment, the aqueous suspension is transported by means of a pipe to a thickener, and the polymer is added to said pipe.

According to another embodiment, the polymer is added to a thickener which already contains the suspension to be treated. In a typical mineral processing operation, slurries are often concentrated in a thickener. This leads to a higher density sludge which exits from the bottom of the thickener, and an aqueous fluid released from the treated suspension (called liquor) which exits by overflow, from the top of the thickener. The addition of the polymer increases the concentration of the sludge and the clarity of the liquor.

According to another embodiment, the polymer is added to the suspension of particles during the transport of said suspension to a deposit zone. Preferably, the polymer is added in the pipe which transports said suspension towards a deposit zone. The treated suspension is spread over this deposit zone for dehydration and solidification. The deposit zones may be non-closed, such as for example an undelimited expanse of ground, or closed, such as for example, a basin, a cell.

An example of such treatment during transport of the suspension is to spread the suspension treated with the polymer according to the invention on the ground for dehydration and solidification and then spreading a second layer of the treated suspension upon the first solidified layer. Another example is the continuous spreading of the suspension treated with the polymer according to the invention in such a way that the treated suspension falls continuously upon the suspension previously discharged in the deposit zone, thus forming a mass of treated material from which water is extracted.

According to another embodiment, the water-soluble polymer is added to the suspension, then a mechanical treatment is carried out, such as centrifugation, pressing, or filtration.

The water-soluble polymer may be added simultaneously in different stages of the treatment of the suspension, i.e., for example in the pipe transporting the suspension to a thickener and in the sludge leaving the thickener which will be directed towards either a deposit zone or to a mechanical treatment device.

The polymer may be added in liquid form or in solid form. The polymer may be added in the form of an emulsion (water in oil), a suspension, a powder, or a dispersion of the polymer in oil. The polymer is preferably added as an aqueous solution.

When the polymer is in solid form, it may be partially or fully dissolved in water using a polymer preparation unit such as the Polymer Slicing Unit (PSU) disclosed in EP 2,203,245.

According to another specific embodiment, the water-soluble polymer is added to the suspension in combination with another synthetic or natural polymer. These polymers may be added simultaneously or separately. The other polymer may be water-soluble or water-swellable. It may be a dispersant, a coagulant, or a flocculant.

According to the invention, the quantity (dosage) of polymer added is between 50 and 5000 g per ton of dry solids of the suspension, preferably between 250 and 2000 g/t and more preferably between 500 and 1500 g/t, depending on the nature and composition of the suspensions to be treated.

According to the invention, the method using the polymer described in the invention makes it possible to effectively treat a suspension of solid particles and more particularly of mineral particles.

Suspensions of solid particles in water include all types of sludge, tailings, or waste materials. The suspensions come more specifically from the extraction of ores and are in the form of mineral particle suspensions. They may be, for example, industrial sludge or tailings and all washing and waste products from mines, such as coal mines, diamond mines, phosphate mines, metal mines (aluminum, platinum, iron, gold, copper, silver, etc . . . ). Suspensions may also come from the extraction of bituminous sands, for example sludges or extraction residues derived from the processing of bituminous sands. These suspensions generally include organic particles and/or minerals, such as for example clays, sediments, sand, metal oxides, petroleum, etc . . . mixed with water.

Generally, suspensions of solid particles are concentrated and contain between 5% and 60% by weight of solids, preferably between 20 and 50% by weight of solids, relative to the total weight of said suspensions.

The method according to the invention is particularly useful for the treatment of tailings coming from oil sand extraction: tailings known as “fines” or “fine tailings”, i.e., containing a large quantity of clays, and for the treatment of fine tailings known as “mature fine tailings” (MFT), i.e., these same fine tailings after a few years of sedimentation, and containing an even greater amount of clays The method according to the invention can also be used to treat so-called “fresh” tailings, that is to say residues coming directly from the operation of separation of the bitumen and the soil from which it is extracted.

According to one particular embodiment of the invention, the aqueous suspension of solid particles is a so-called “mature” fine tailings, that is to say a Mature Fine Tailing (MFT), resulting from the extraction of bituminous sand.

Treatment of oil sand tailings has recently become a growing problem in Canada. Scrap tailings are sent to tailings ponds or thickeners for subsequent water management. Oil sands tailings are alkaline aqueous suspensions that contain residual unrecovered bitumen, salts, soluble organic compounds, sands and clays. Tailings are discharged to tailings ponds for storage.

Tailings ponds are closely regulated by the Canadian government. It takes two to four barrels of water per barrel of oil produced by the oil sands process. When the tailings slurry is discharged to the tailings ponds, coarse solid particles such as sand separate by gravity, while water and fine solid particles, such as clays remain as suspensions in the tailings pond. A layer of mature fine tailings (MFT) develops after two to three years. MFTs consolidate very slowly. It is estimated that the complete sedimentation process without any treatment lasts almost a century.

The use of the polymer described in the invention makes it possible to treat MFTs in just a few days. They help increase drainage, water release, and general dehydration of MFTs. They also improve the mechanical properties of the materials obtained after water separation plus they improve the clarity of the aqueous fluid released (also called liquor). This makes it possible to reuse the clarified water and its immediate availability for re-circulation in the industrial plant, typically for the separation stage of bitumen from the soil from which it is extracted Although the polymer according to the invention is particularly advantageous in the processes described above, it may be used in the following applications and uses.

Use of the Polymer According to the Invention

The invention also relates to the use of the polymer according to the invention in the recovery of oil and gas, in the drilling and cementing of wells, in the stimulation of oil and gas wells (for example the hydraulic fracking, conformance, diversion), in the treatment of water in open, closed or semi-closed circuits, in the treatment of fermentation musts, in the treatment of sludge, in the manufacture of paper, in construction, in the treatment of wood, in the treatment of hydraulic composition (concrete, cement, mortar and aggregates), in the mining industry, in the formulation of cosmetic products, in the formulation of detergents, in the manufacture of textiles, in the manufacturing components for batteries, in geothermal energy, in the manufacture of sanitary napkins, or in agriculture.

The invention also relates to the use of the polymer according to the invention as a flocculant, coagulant, binding agent, fixing agent, viscosity reducing agent, thickening agent, absorbing agent, friction reducing agent, draining agent, drainage agent, filler retention agent, dehydrating agent, conditioning agent, stabilizing agent, fixing agent, film-forming agent, sizing agent, superplasticizer, clay inhibitor, or dispersant.

Other objects are described below.

Polymer obtained from 2-acrylamido-2-methylpropane sulfonic acid and/or one of its salts at least partially of renewable and non-fossil origin, said polymer being obtained by inverse emulsion polymerization. Said polymer may be linear, branched, cross-linked, star-shaped, or in the form of a comb polymer. Said polymer may be used in the applications and uses previously described. Polymer obtained from 2-acrylamido-2-methylpropane sulfonic acid and/or one of its salts at least partly of renewable and non-fossil origin, said polymer being obtained by gel polymerization. Said polymer may be linear, branched, cross-linked, star-shaped, or in the form of a comb polymer. Said polymer may be used in the applications and uses previously described.

Polymer obtained from 2-acrylamido-2-methylpropane sulfonic acid and/or one of its salts at least partly of renewable and non-fossil origin, said polymer being obtained by inverse emulsion polymerization and then by drying said inverse emulsion in order to obtain solid particles of said polymer. Said polymer is preferentially cross-linked. Use of said solid polymer in the form of solid particles in the applications and uses previously described, and particularly in cementitious compositions for construction and in thickening compositions in the textile field. Said solid form may be in the form of a powder or a bead.

Branched or cross-linked polymer obtained from 2-acrylamido-2-methylpropane sulfonic acid and/or one of its salts at least partially of renewable and non-fossil origin and at least one crosslinking agent or a branching agent comprising at least two unsaturated ethylenic functions, said polymer being obtained by inverse emulsion polymerization. Use of said polymer in the applications and uses described above, and particularly in cosmetic or detergent compositions.

Branched or cross-linked polymer obtained from 2-acrylamido-2-methylpropane sulfonic acid and/or one of its salts at least partially of renewable and non-fossil origin and at least one crosslinking agent or a branching agent comprising at least two unsaturated ethylenic functions, said polymer being obtained by polymerization by the gel route. Use of said polymer in the applications and uses described above, and particularly in cosmetic or detergent compositions.

Branched or cross-linked polymers obtained from 2-acrylamido-2-methylpropane sulfonic acid and/or one of its salts at least partially of renewable and non-fossil origin, said polymer being obtained by polymerization by precipitation, are polymers that are quite feasible and usable in the applications and uses described above, but they do not provide benefits technical and industrial. The same is true for the same polymers obtained by solution polymerization.

The invention and its resulting advantages are particularly apparent from the following non-limiting embodiments.

EXAMPLES

Example 1: Synthesis of Polymers P1 to P7 According to the Invention and Comparative CE1 to CE3 (Counterexamples) by Gel Process Deionized water, 50% sodium hydroxide (by weight in water), and monomers (see Table 2) are added to a 2000 mL beaker.

The solution thus obtained is cooled to between 5 and 10° C. and then transferred to an adiabatic polymerization reactor. Nitrogen bubbling is then carried out for 30 minutes in order to eliminate all traces of dissolved oxygen.

The following are then added to the reactor:

0.45 g of 2,2'-azobisisobutyronitrile, 1.5 mL of an aqueous solution at 2.5 g/L of 2,2'-Azobis [2-(2-imidazolin-2-yl)propane]dihydrochloride, 1.5 mL of a 1 aqueous solution 1 g/L of sodium hypophosphite, 1.5 mL of an aqueous solution of 1 g/L of tert-butyl hydroperoxide, 1.5 mL of a 1 aqueous solution 1 g/L ammonium sulfate and iron(II) hexahydrate (Mohr's salt).

After a few minutes, the nitrogen bubbling is stopped. The polymerization reaction takes place for 4 hours until a temperature peak is reached. At the end of this period, the polymer gel obtained is chopped and dried and then ground again to obtain a polymer in the form of a powder.

TABLE 2

| Polymer | P1 | P2 | P3 | P4 | P5 | P6 | P7 | CE1 | CE2 | CE3 |
|---|---|---|---|---|---|---|---|---|---|---|
| Mass AA (g) | 30 | 30 | 0 | 0 | 0 | 0 | 0 | 30 | 0 | 0 |
| % of carbon-14 by weight of AA | 80 | 20 | X | X | X | X | X | 80 | X | X |
| AM Mass 50% (g) | 330 | 330 | 0 | 60 | 300 | 300 | 420 | 330 | 0 | 300 |
| % of carbon-14 by weight of AM | 80 | 20 | X | 80 | 60 | 100 | 60 | 80 | X | 60 |
| Mass of AMPS(g) | 105 | 105 | 300 | 270 | 150 | 150 | 90 | 105 | 300 | 150 |
| % of carbon-14 by weight of AMPS | 70 | 100 | 100 | 80 | 100 | 100 | 100 | 0 | 0 | 0 |
| Soda lye 50% (g) | 74 | 74 | 116 | 104 | 58 | 58 | 35 | 74 | 116 | 58 |
| Deionized water (g) | 461 | 461 | 584 | 566 | 492 | 492 | 455 | 461 | 584 | 492 |

(AA = acide acrylic; AM = acrylamide; AMPS = 2-acrylamido-2-methylpropane sulfonic acid)

Example 2: Synthesis of Polymers P8 to P11 According to the Invention and Comparative CE4 to CE5 (Counter-Examples) in Inverse Emulsion Deionized water, 50% sodium hydroxide (by weight in water), and monomers (see Table 3), are added to a 1 liter jacketed reactor, equipped with a condenser and a stirring rod.

An oil phase is prepared in a beaker by adding 160 g of Exxsol D100S (Distillates (petroleum), hydrotreated light) and the following emulsifying agents: 4.2 g of Span® 80 (sorbitan monooleate) and 15 g of Tween® 81 (monooleate of sorbitan 5EO).

The water phase is added to the oil phase while mixing to form an emulsion. The resulting dispersion is bubbled with nitrogen for 30 minutes while the temperature is stabilized at 25° C., then 0.002 wt % peroxide is added to the emulsion and a 0.075 wt % solution of sodium metabisulfite (MBS) is introduced into the dispersion at a flow rate of 0.1 milliliter per minute. The polymerization temperature is controlled between 38° C. and 42° C. for approximately 90 minutes. Residual monomers are then trapped by introducing a 0.03 wt % solution of sodium metabisulfite (MBS) at a flow rate of 1.0 milliliter per minute. A water-in-oil polymeric emulsion is obtained. 50 g of Surfonic L24-7 (reversing agent) is added to the water-in-oil polymer emulsion to facilitate development during use.

TABLE 3

| Polymer | P8 | P9 | P10 | P11 | CE4 | CE4 |
|---|---|---|---|---|---|---|
| AA Mass (g) | 0 | 0 | 40 | 40 | 0 | 40 |
| % AA carbon-14 by weight | X | X | 50 | 50 | X | 0 |
| Mass AM 50% (g) | 450 | 450 | 419 | 419 | 450 | 419 |

TABLE 3-continued

| Polymer | P8 | P9 | P10 | P11 | CE4 | CE4 |
|---|---|---|---|---|---|---|
| % of carbon-14 by weight of AM | 30 | 30 | 20 | 20 | 0 | 0 |
| Mass of AMPS(g) | 72 | 72 | 38 | 38 | 72 | 38 |
| % of carbon-14 by weight of AMPS | 70 | 100 | 70 | 100 | 0 | 0 |
| Soda lye 50% (g) | 28 | 28 | 59 | 59 | 28 | 59 |
| Deionized water (g) | 256 | 256 | 181 | 181 | 256 | 181 |

Example 3: Filter-Ratios (FR)

Filtration tests are carried out on polymers P1 to P11 according to the invention and comparatives CE1 to CE5. These polymers are dissolved at a concentration of 1000 ppm in a brine containing water, 30,000 ppm of NaCl and 3,000 ppm of $CaCl_2 \cdot 2H_2O$. Filter-ratios (FR) are measured on filters that have a pore size of 1.2 μm, representative of low permeability deposits. The results are shown in Table 4.

TABLE 4

| Polymer | Average molecular weight (in millions of daltons) | Filter-Ratio (FR) |
|---|---|---|
| P1 | 19 | 1.04 |
| P2 | 18 | 1.02 |
| P3 | 16 | 1.03 |
| P4 | 17 | 1.07 |
| P5 | 22 | 1.05 |
| P6 | 23 | 1.04 |
| P7 | 25 | 1.08 |
| CE1 | 15 | 1.26 |
| CE2 | 13 | 1.28 |
| CE3 | 17 | 1.29 |
| P8 | 17 | 1.1 |
| P9 | 18 | 1.08 |
| P10 | 20 | 1.1 |
| P11 | 22 | 1.08 |
| CE4 | 15 | 1.32 |
| CE5 | 17 | 1.35 |

Polymers P1, P2, P9, and P10 according to the invention as well as the comparative polymers CE1, CE4 and CE5 are dissolved with stirring at a concentration of 10,000 ppm in a brine composed of water, 85 g of sodium chloride (NaCl) and 33.1 g of calcium chloride ($CaCl_2$, 2 $H_2O$) per liter of brine. The polymer saline solutions thus obtained are then injected at a concentration of 0.5 ppg into the brine put into circulation for the Flow Loop tests.

In fact, to evaluate the friction reduction of each of the polymers, the loop tank of the Flow Loop was filled with 20 L of brine as described above. The Flow Loop is a friction flow loop, constructed from stainless steel tubing with a quarter inch outside diameter and 20 feet overall length. Test solutions are pumped into the bottom of a 5 liter conical tank. The solution passes through the tubing and is returned to the tank. The flow is obtained using a triplex pump equipped with a variable speed drive.

The brine is then circulated through the Flow Loop at a rate of 24 gallons per minute. The polymer is added at a concentration of 0.5 ppg into the recirculating brine. The percentage of friction reduction is thus determined by measuring pressure variations inside the Flow Loop.

Pressure is recorded every second for 5 minutes. The percent of friction reduction (% FRt), at any given time 't', is calculated from the initial pressure drop ΔPi and the pressure drop at time t, ΔPt, using the equation $$\% \ FR_i = \frac{\Delta P_i - \Delta P_t}{\Delta P_i} \times 100$$

Figure 2:
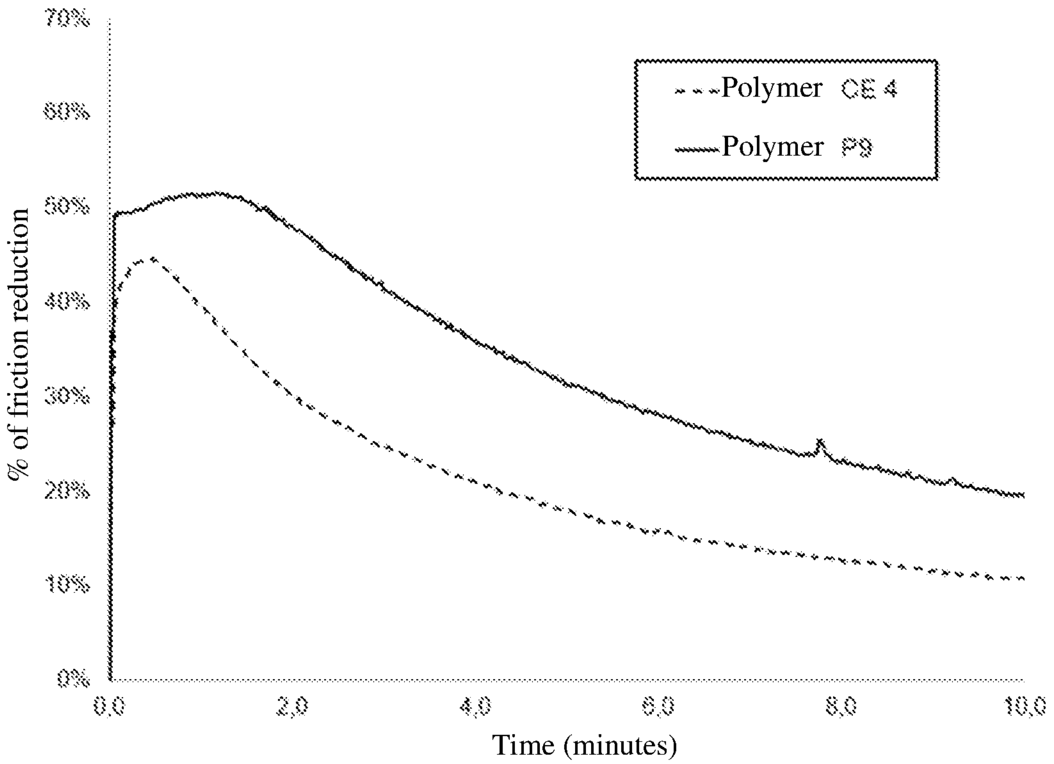
Figure 3:
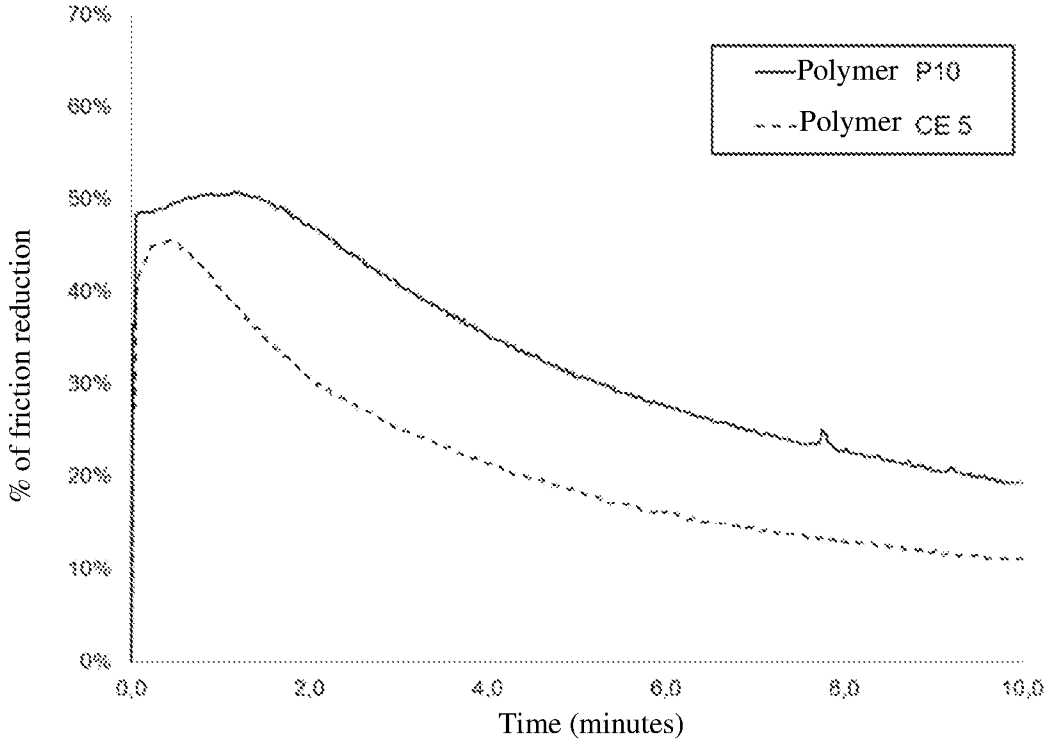

The graphs of FIGS. 1 to 3 represent the percentage of friction reduction as a function of time for the brine that contains each of the polymers.

Friction reduction is improved when the brine contains the polymers of the invention (compared to the polymers of the counter-examples)

Example 5

Chemical degradation resistance tests of the polymers P3 to P6 according to the invention and the comparatives CE2 to CE3 were carried out under aerobic conditions in the presence of different concentrations of iron (II) (2, 5, 10 and 20 ppm) in a brine composed of water, 37,000 ppm NaCl, 5,000 ppm $Na_2SO_4$ and 200 ppm $NaHCO_3$., The polymers are dissolved at a concentration of 1000 ppm in brines containing Iron (II). The results of the degradation tests (Table 5) are obtained after 24 hours. Each percentage loss of viscosity is determined by comparing the viscosity of the polymer solution in the brine after dissolution of the polymer ($t_o$) and its viscosity after 24 h ($t_{24h}$). Viscosities are measured with a Brookfield viscometer (UL module, 25° C., $60^{rpm}$).

TABLE 5

| | Iron (II) concentration | | | |
|---|---|---|---|---|
| Polymer | 2 ppm | 5 ppm | 10 ppm | 20 ppm |
| | % loss of viscosity | | | |
| P3 | 2.4 | 6 | 9.6 | 12 |
| P4 | 3.6 | 7.2 | 10.8 | 14.4 |
| P5 | 6 | 9.6 | 14.4 | 18 |
| P6 | 3.6 | 8.4 | 12 | 15.6 |
| CE2 | 12 | 18 | 25.2 | 38.4 |
| CE3 | 16.8 | 21.6 | 30 | 42 |

Example 6

The polymers are dissolved in tap water in order to obtain aqueous solutions having a concentration of 0.4% by weight of polymer relative to the total weight of the solution. The solutions are mechanically stirred at 500 tr/min until the polymers are completely solubilized and the clear and homogeneous solutions have been obtained.

A series of flocculation tests are carried out on a mining effluent coming from a coal mine, and having a solid content of 17.4% by weight.

A quantity of each solution, corresponding to a polymer dosage of 280 g of polymer per ton of dry matter of the mining effluent, is added to 200 g of mining effluent. Thorough manual mixing is carried out until flocculation and optimum water release are observed.

The result is expressed by means of the NWR (Net Water Release) which corresponds to the total amount of water recovered 1 h after the flocculation test, minus the amount of water improperly added during the incorporation of the polymeric aqueous solution into the suspension. The same NWR is calculated after 24 hours, which gives a good overview of the maximum water release. At the end of these 24 hours, the turbidity of the supernatant water thus released is also measured. The results in Table 6 demonstrate that the polymers of the invention make it possible to improve the NWR and the turbidity of the supernatant (compared to the comparative polymers CE2 and CE3).

TABLE 6

| Polymer | NWR 1 hour | NWR 24 hours | Turbidity (NTU) |
|---|---|---|---|
| P3 | 92 | 96 | 10 |
| P4 | 90 | 93 | 12 |
| P6 | 84 | 89 | 11 |
| P7 | 84 | 88 | 13 |
| CE2 | 78 | 82 | 18 |
| CE3 | 75 | 80 | 25 |

What is claimed is:

1. A water-soluble polymer of 2-acrylamido-2-methylpropane sulfonic acid and/or one of its salts, wherein said 2-acrylamido-2-methylpropane sulfonic acid and/or one of its salts being at least partially of renewable and non-fossil origin, wherein said 2-acrylamido-2-methylpropane sulfonic acid and/or one of its salts comprises a biobased carbon content of between 5% by weight and 100% by weight relative to the total weight of carbon in said 2-acrylamido-2-methylpropane sulfonic acid, the biobased carbon content being measured according to method B of standard ASTM D6866-21, and wherein the water-soluble polymer has a weight-average molecular weight of between 11 and 40 million Daltons.

2. The water-soluble polymer according to claim 1, wherein the water-soluble polymer has a filter-ratio FR of less than 1.2.

3. The water-soluble polymer according to claim 2, wherein the filter-ratio FR is less than 1.1.

4. The water-soluble polymer according to claim 1, wherein the water-soluble polymer is obtained by gel polymerization or by inverse emulsion polymerization.

5. The water-soluble polymer according to claim 1, wherein the water-soluble polymer has a weight-average molecular weight of between 15 million and 40 million daltons.

6. The water-soluble polymer according to claim 1, wherein the water-soluble polymer contains at least 20 mol % 2-acrylamido-2-methylpropane sulfonic acid and/or one of its salts being at least partially of renewable and non-fossil origin.

7. The water-soluble polymer according to claim 1, wherein the water-soluble polymer contains at least 90 mol % 2-acrylamido-2-methylpropane sulphonic acid and/or one of its salts being at least partly of renewable and non-fossil origin.

8. The water-soluble polymer according to claim 1, wherein the water-soluble polymer contains between 20% and 99% molar, of a first monomer, said first monomer being 2-acrylamido-2-methylpropane sulfonic acid and/or one of its salts which is at least partially of renewable and non-fossil origin, and between 1% and 80% molar of at least one second monomer comprising an unsaturated ethylene monomer, said second monomer being different from the first monomer, and being at least partially of renewable and non-fossil origin.

9. A method for enhanced oil or gas recovery by flushing a subterranean formation comprising injecting into the subterranean formation an aqueous composition comprising:

a. preparing an injection fluid from a water-soluble polymer according to claim 1, with water or brine, b. injecting the injection fluid into a subterranean formation, c. sweeping the subterranean formation using the injected fluid, d. recovering an aqueous, oily, and/or gaseous mixture.

10. The method for enhanced oil or gas recovery according to claim 9, wherein the injection fluid contains between 0.03 and 0.4 wt % of water-soluble polymer, based on the total weight of the injection fluid.

11. A method of hydraulic fracking of underground oil or gas reservoir comprising:

a. preparing an injection fluid from a polymer according to claim 1, with water or brine, and optionally with at least one proppant, b. injecting said fluid into the underground reservoir and fracking at least one part thereof in order to recover the oil and/or the gas.

12. The hydraulic fracking method according to claim 11, wherein the injection fluid comprises between 0.025% and 1%, by weight of water-soluble polymer, relative to the total weight of the injection fluid.

13. A method to treat a slurry of solid particles in water resulting from mining or oil sands operations, comprising contacting said slurry with at least one polymer according to claim 1.

14. The treatment method according to claim 13, wherein the suspension of solid particles contains between 5 and 60% by weight of solid particles, relative to the total weight of said suspension.

15. The treatment method according to claim 13, wherein the suspension of solid particles contains between 20 and 50% by weight of solid particles, based on the total weight of said suspension.

16. The treatment method according to claim 13, wherein the quantity of polymer brought into contact with the suspension is between 50 and 5,000 g per ton of solid particles of the suspension.

* * * * *